United States Patent
Stallkamp

(10) Patent No.: US 7,496,098 B2
(45) Date of Patent: Feb. 24, 2009

(54) METHOD OF GENERATING TIMESTAMPS FOR ISOCHRONOUS DATA

(75) Inventor: Richard Wissler Stallkamp, Tigard, OR (US)

(73) Assignee: Omneon Video Networks, Sunnyvale, CA (US)

( * ) Notice: Subject to any disclaimer, the term of this patent is extended or adjusted under 35 U.S.C. 154(b) by 500 days.

(21) Appl. No.: 11/003,789

(22) Filed: Dec. 2, 2004

(65) Prior Publication Data
US 2005/0078711 A1    Apr. 14, 2005

Related U.S. Application Data

(63) Continuation of application No. 09/544,738, filed on Apr. 7, 2000, now Pat. No. 6,895,009.

(51) Int. Cl.
H04L 12/28 (2006.01)
(52) U.S. Cl. ...................................................... 370/394
(58) Field of Classification Search ............. 370/230.1, 370/252, 394, 395.62, 395.65, 503, 508–517, 370/522; 375/354, 355; 709/220, 223, 248, 709/249
See application file for complete search history.

(56) References Cited

U.S. PATENT DOCUMENTS

| | | | |
|---|---|---|---|
| 5,689,507 A | | 11/1997 | Bloks et al. |
| 5,781,599 A | * | 7/1998 | Shiga .......................... 375/376 |
| 6,032,261 A | | 2/2000 | Hulyalkar |
| 6,064,677 A | | 5/2000 | Kappler |
| 6,128,318 A | * | 10/2000 | Sato ............................ 370/503 |
| 6,266,384 B1 | | 7/2001 | Acampora |
| 6,347,084 B1 | * | 2/2002 | Hulyalkar et al. ........... 370/347 |
| 6,377,583 B1 | | 4/2002 | Lyles |
| 6,418,150 B1 | * | 7/2002 | Staats ........................ 370/503 |
| 6,661,811 B1 | * | 12/2003 | Baker ......................... 370/516 |
| 6,879,602 B1 | * | 4/2005 | Sugita et al. ................ 370/503 |
| 6,895,009 B1 | | 5/2005 | Stallkamp |

FOREIGN PATENT DOCUMENTS

EP    0873019 A1    8/1997

(Continued)

OTHER PUBLICATIONS

B. Moses et al., Audio Distribution and Control using the IEEE 1394 Serial Bus, 1999, pp. 1-20, PAVO, Inc., Seattle, Washington [available in IFW of parent U.S. Pat. No. 6,895,009].

(Continued)

Primary Examiner—Dmitry Levitan
(74) Attorney, Agent, or Firm—Hickman Palermo Truong & Becker LLP

(57) ABSTRACT

A method of generating timestamps for isochronous data includes locking a data stream time and an isochronous network time to a local clock signal such that a bi-directional mapping may be made between the two time domains. Timing information is extracted from both IEEE 1394 based data packets and a conventional house reference signal in order to obtain scale and offset factors that exist between the two signals. The scale and offset factors are applied to a generated video clock signal in order to predict a future video time in terms of IEEE 1394 time.

17 Claims, 4 Drawing Sheets

FOREIGN PATENT DOCUMENTS

| | | |
|---|---|---|
| EP | 0873019 A2 | 8/1997 |
| EP | 0838926 A2 | 10/1997 |
| WO | WO99/46937 | 3/1999 |
| WO | WO99/59047 | 5/1999 |
| WO | 199959047 A1 | 11/1999 |

OTHER PUBLICATIONS

Anonymous, International Standard, "Consumer audio/video equipment-Digital interface," 1998, pp. 1-83 [available in IFW of parent U.S. Pat. No. 6,895,009].

R. Lau, "Synchronous Techniques for Timing Recovery in BISDN," Feb.-Mar.-Apr. 1995, 9 pages, IEEE Transactions on Communications Nos. 2-3-4, Pt III, New York, US [available in IFW of parent U.S. Pat. No. 6,895,009].

Bob Moses and Greg Bartlett, *Audio Distribution and Control using the IEEE 1394 Serial Bus*, 1999, pp. 1-20, PAVO, Inc., Seattle, WA.

International Standard, *Consumer audio/video equipment-Digital interface*, 1998, pp. 1-83, First Edition.

Richard C. Lau, *Synchronous Techniques for Timing Recovery in BISDN*, Feb./Mar./Apr. 1995, 9 pgs, IEEE Transactions on Communications, Nos. 2/3/4, Pt III, New York, US.

Mutlu, Arpaci, "Communication pursant to Article 94(3) EPC," European Patent Office, Rijswijk (The Hauge), Netherlands, mailed Aug. 12, 200, 7 pages. 2008.

* cited by examiner

-- Prior Art --

METHOD OF GENERATING TIMESTAMPS FOR ISOCHRONOUS DATA

This application is a continuation of application Ser. No. 09/544,738, filed Apr. 7, 2000 now U.S. Pat. No. 6,895,009.

BACKGROUND OF INVENTION

1. Field of the Invention

The present invention generally relates to the field of audio and video processing. More specifically, the present invention relates to a method of generating timestamps for isochronous data.

2. Background Information

One characteristic that all isochronous transport mechanisms share is the ability to transmit data within certain fixed time constraints whereby maximum data latency and minimum bandwidth allocation is guaranteed. Isochronous transport mechanisms are useful, for example, in the transfer of multimedia data where synchronization of audio and video upon playback is important. To that end, a sound or picture transmitted from a device such as a digital video camera, across a network to a display device, for example, should be received at the display device at nearly the same rate the data was transmitted from the video camera.

Isochronous networks typically grant the highest priority access to a device known as a cycle master that maintains a common clock source for the network. Timing information is exchanged within isochronous networks through the use of timestamps within network packets. Using timestamps, the cycle master transmits to all isochronous nodes, a periodic timing request known as a "cycle start" indicating the start of each isochronous cycle. Each node with isochronous service contains a 32-bit "cycle timer register". The low-order 12-bits of the register represent a module 3072 count, which increments once every 24.576 MHz clock period. The next 13 higher order bits represent a count of 8 kHz cycles, and the highest 7 bits represent a count of seconds. If a cycle start is delayed, the amount of time that the cycle start was delayed is encoded within the data packet which is broadcast to the cycle timer register of each node on the network. The cycle master copies its cycle timer register to all isochronous nodes along with the cycle start request, thereby synchronizing all nodes to be within a constant phase difference.

The IEEE Standard for a High Performance Serial Bus, IEEE Std. 1394-1995 published Aug. 30, 1996 (1394-1995 Standard) and its progeny provide a high speed serial protocol which permits implementation of high speed data transfers of both asynchronous and isochronous data. The existing progeny includes P1394a Draft Standard for a High Performance Serial Bus (1394a Standard) and P1394b Draft Standard for a High Performance Serial Bus (1394b Standard). Generically, networks implementing 1394-1995, 1394a, 1394b or subsequent revisions and modifications thereof are referred to herein as IEEE 1394 networks. Additionally, information regarding a general isochronous packet format used in conjunction with IEEE 1394 may be found in the International Electrotechnical Commission standard 61883-1:1998-02 (hereinafter "IEC 61883").

In order to preserve data ordering on an IEEE 1394 network, each isochronous packet of audio/video data is timestamped before it is transmitted. Each timestamp is based upon the current cycle-time of the isochronous network as determined by the cycle master. It is possible, however, that the audio/video data may have been generated based upon an external reference signal (e.g. a house reference signal) having an operating frequency that is asynchronous to that of the cycle master. Because isochronous packets are consumed (i.e. replayed) at destination nodes according to the packet's respective isochronous timestamps independent of the frequency at which the data was originally generated, audio/video playback may be adversely affected if the reference clocks and IEEE 1394 clocks are allowed to drift from one another. Furthermore, because isochronous packets are based on a first time domain as determined by the cycle master, and audio/video data is based upon a second time domain, typically a house reference signal, it is often difficult to accurately reconstruct audio/video data after it has been transmitted over an isochronous network.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method of generating timestamps for isochronous data is disclosed. In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below.

Although all or some of the operations may be performed by software executing on one or more processing devices (e.g., CPUs) on a computer system or specialized apparatus, some or all of these operations may be performed by digital logic and/or circuitry, as well as an integrated circuit (e.g., ASIC) or other semiconductor substrates.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
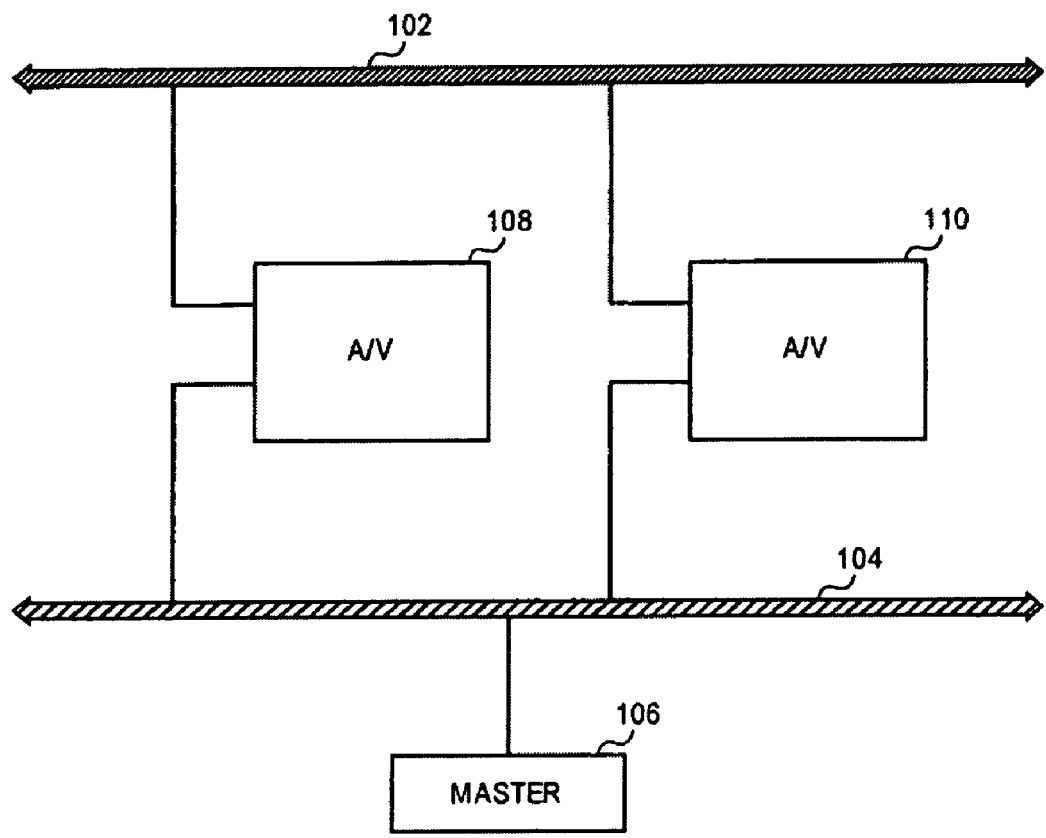
FIG. 1 is a block diagram illustrating an exemplary audio/video communication network including an isochronous transport medium.

FIG. 1 is a block diagram illustrating audio/video (A/V) devices 108 and 110 coupled to isochronous transport medium 104 as well as reference signal line 102. A/V devices 108 and 110 represent a broad range of audio and/or video components known in the art to process audio and/or video data. For example, A/V devices 108 and 110 may represent one or more audio and video recording, generation, and/or playback devices. In one embodiment, at least one of A/V devices 108 and 110 represents a digital video camera equipped to generate and record digital video images in addition to recording associated audio signals.

Isochronous transport medium (hereinafter "isochronous network") 104 represents a data distribution network configured to transmit data within certain fixed time constraints as determined by a cycle master. Master 106 represents a device equipped to function as a cycle master for isochronous network 104. As a cycle master, master 106 maintains a clock signal common to all nodes connected to isochronous network 104 including A/V devices 108 and 110. Master 106 periodically transmits cycle start signals across isochronous network 104 to alert the variously connected devices as to when to begin data transmission. In one embodiment, network 104 is an IEEE 1394 compliant communications network and master 106 is equipped to function as a cycle master in accordance with the IEEE 1394 standard. Although master 106 may additionally possess the functionality of any number of audio and/or video devices known in the art, for the purpose of this disclosure such functionality need not be described. Likewise, although A/V devices 108 and 110 are described as merely representing nodes on an isochronous network, it will be apparent to one skilled in the art that either of A/V devices 108 and 110 may additionally be equipped to function as a cycle master in lieu of master 106.

Reference signal line 102 represents a signal line by which synchronization signals may be transmitted to one or more devices, such as A/V devices 108 and 110, such that the devices operate according to the same operating frequency. In one embodiment, reference signal line 102 represents a coaxial distribution bus configured to distribute a house reference signal (also known as "video black") to the various audio/video devices connected to signal line 102. In one embodiment, reference signal line 102 distributes a synchronization signal that is asynchronous to the isochronous clock signal distributed across isochronous network 104 by master 106.

Figure 2:
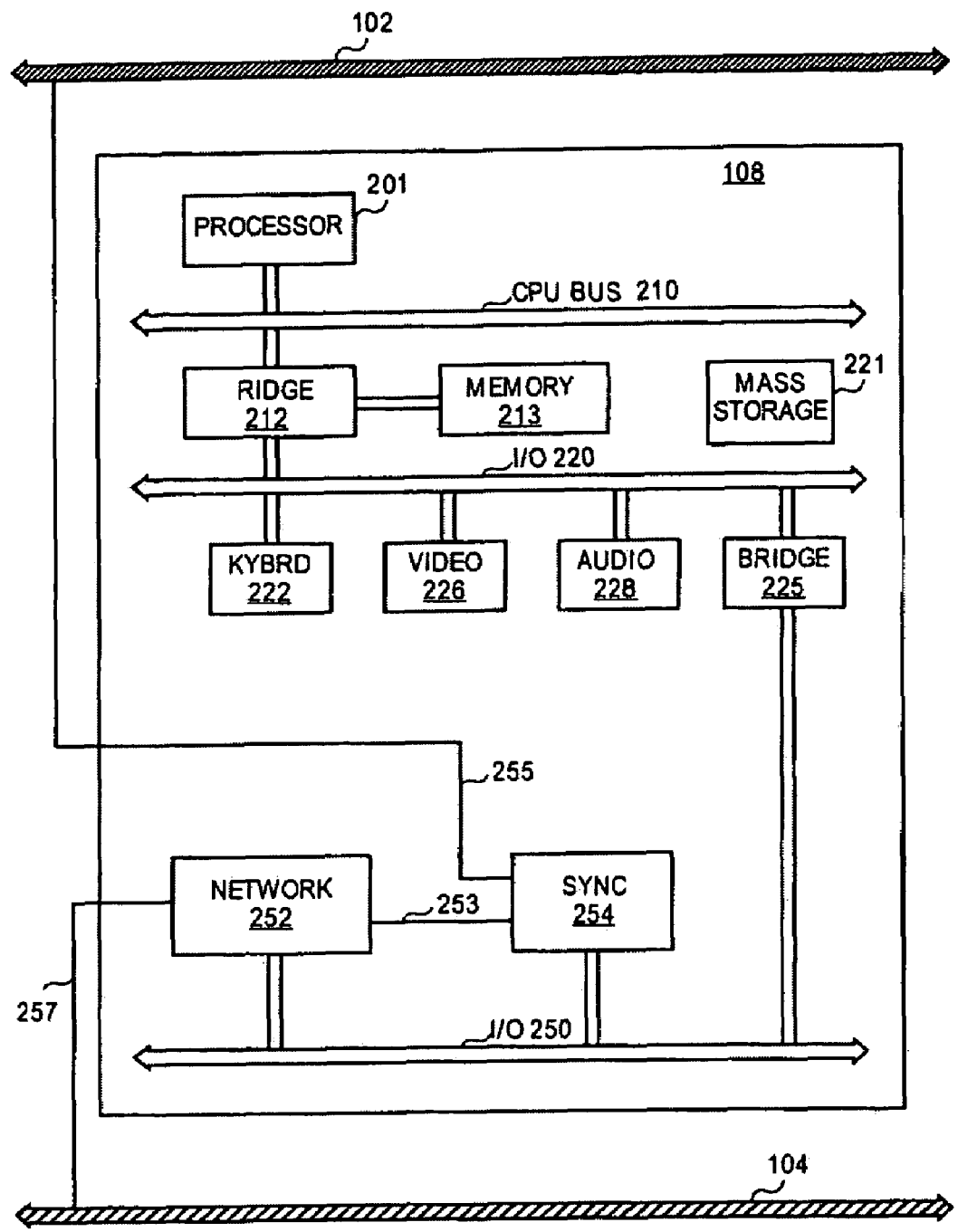
FIG. 2 is a block diagram illustrating an audio/video device according to one embodiment of the present invention.

FIG. 2 is a block diagram further illustrating A/V device 108 according to one embodiment of the present invention. A/V device 108 includes processor 201 to process signals and execute stored instructions. Processor 201 may represent a complex instruction set computing (CISC) microprocessor, a reduced instruction set computing (RISC) microprocessor, a processor implementing a combination of instruction sets, or some other processing device known in the art. Although FIG. 2 illustrates a single processor 201, it will be appreciated that A/V device 108 may comprise multiple processing devices.

Processor 201 is coupled to CPU bus 210 that transmits data signals between processor 201 and other components of A/V device 108 by way of bridge/memory controller 212. Bridge/memory controller 212 is coupled to CPU bus 210, memory 213, and first I/O bus 220 to direct data signals between the respective components. Memory 213 represents a memory storage device such as dynamic random access memory (DRAM), synchronous dynamic random access memory (SDRAM), or any other volatile or non-volatile memory device known in the art. In one embodiment, memory 213 temporarily stores instructions and code represented by data signals that, when executed by processor 201, cause A/V device 108 to perform various functions described herein. As will be appreciated by those skilled in the art, A/V device 108 may additionally include a cache memory (not shown) coupled either directly or indirectly to processor 201.

First I/O bus 220 represents one or more data buses such as an IEEE 1394 backplane, a Peripheral Component Interconnect (PCI) bus, a Personal Computer Memory Card International Association (PCMCIA) bus, or any other bus structure known in the art. First I/O bus 220 couples processor 201 and memory 213 to various other components within A/V device 108, such as for example, mass storage device 221, keyboard controller 222, video controller 226, and audio controller 228.

Mass storage device 221 represents a data storage medium such as a hard disk drive, a floppy disk drive, a CD-ROM device, a flash memory device or any other such mass storage device known in the art to store data. In one embodiment, mass storage device stores instructions and/or code that when executed by processor 201, causes A/V device 108 to perform all or some of the functions described herein. Keyboard controller 222 represents a user input interface for use with a keyboard or pointing device such as a mouse. Video controller 226 represents an interface that enables coupling of a display device (not shown) to A/V device 108. Video controller 226 may represent any of the various graphics adapter cards known in the art to display data on a display device, while audio controller 228 represents an interface that operates to coordinate the recording and rendering of audio in A/V device 108.

Bridge 225 is coupled to both I/O bus 220 and second I/O bus 250 and functions to pass data signals between the two buses. Like first I/O bus 220, second I/O bus 250 may also represent one or more data buses such as an IEEE 1394 backplane, a Peripheral Component Interconnect (PCI) bus, a Personal Computer Memory Card International Association (PCMCIA) bus, or any other bus structure known in the art. It should be noted, however, that the existence of multiple buses is not required in order to practice the present invention. For example, either one or both of network controller 252 and synchronizer 254 may be coupled to first I/O bus 220 rather than second I/O bus 250 as shown in FIG. 2. Likewise, any or all of the components coupled to first I/O bus 220 may be coupled to second I/O bus 250 without departing from the spirit and scope of the invention.

Network controller 252 communicatively links A/V device 108 to any number of external data networks such as for example, isochronous network 104. In one embodiment, network controller 252 includes logic to implement an IEEE 1394 compliant physical layer (PHY) providing isochronous signaling to isochronous network 104 through isochronous signal line 257. In another embodiment network controller 252 provides internal isochronous signaling to A/V device 108 via second I/O bus 250 to implement an IEEE 1394 backplane. Upon receiving an isochronous network packet, network controller 252 separates packet header information from packet data. In one embodiment, the packet data is passed to various components of A/V device 108 including processor 201 by way of second I/O bus 250. In one embodiment, network controller 252 also functions to recover timestamp information from the received isochronous packet headers. As each timestamp is recovered, it is forwarded to synchronizer 254 through, for example, side-band connection 253. In other embodiments, the timestamp information may equivalently be passed to synchronizer 254 through second I/O bus 250.

Synchronizer 254 represents logic equipped to synchronize the operating frequency of A/V device 108 with that of other devices, such as A/V device 110. In one embodiment, synchronizer 254 utilizes a house reference signal 255 distributed via reference signal line 102 for example, to synchronize such operating frequencies. Further, synchronizer 254 enables data based in one time domain (i.e. house reference time domain) to be transmitted over an isochronous network in terms of a second time domain (i.e. that defined by an isochronous cycle master). For example, processor 201 replays stored video frames at a designated rate (typically measured in frames per second—fps) proportional to the operating frequency at which the frames were originally generated and/or recorded. In contrast, isochronous networks, such as isochronous transport medium 104, transmit data based upon time constraints determined by a cycle master. In the event that an A/V device is coupled to both an isochronous network and a house reference signal that operates asynchronously to the cycle time of the isochronous network, time-sensitive data streams generated with respect to the house reference signal may be adversely affected by transmission across the isochronous network.

Figure 3:
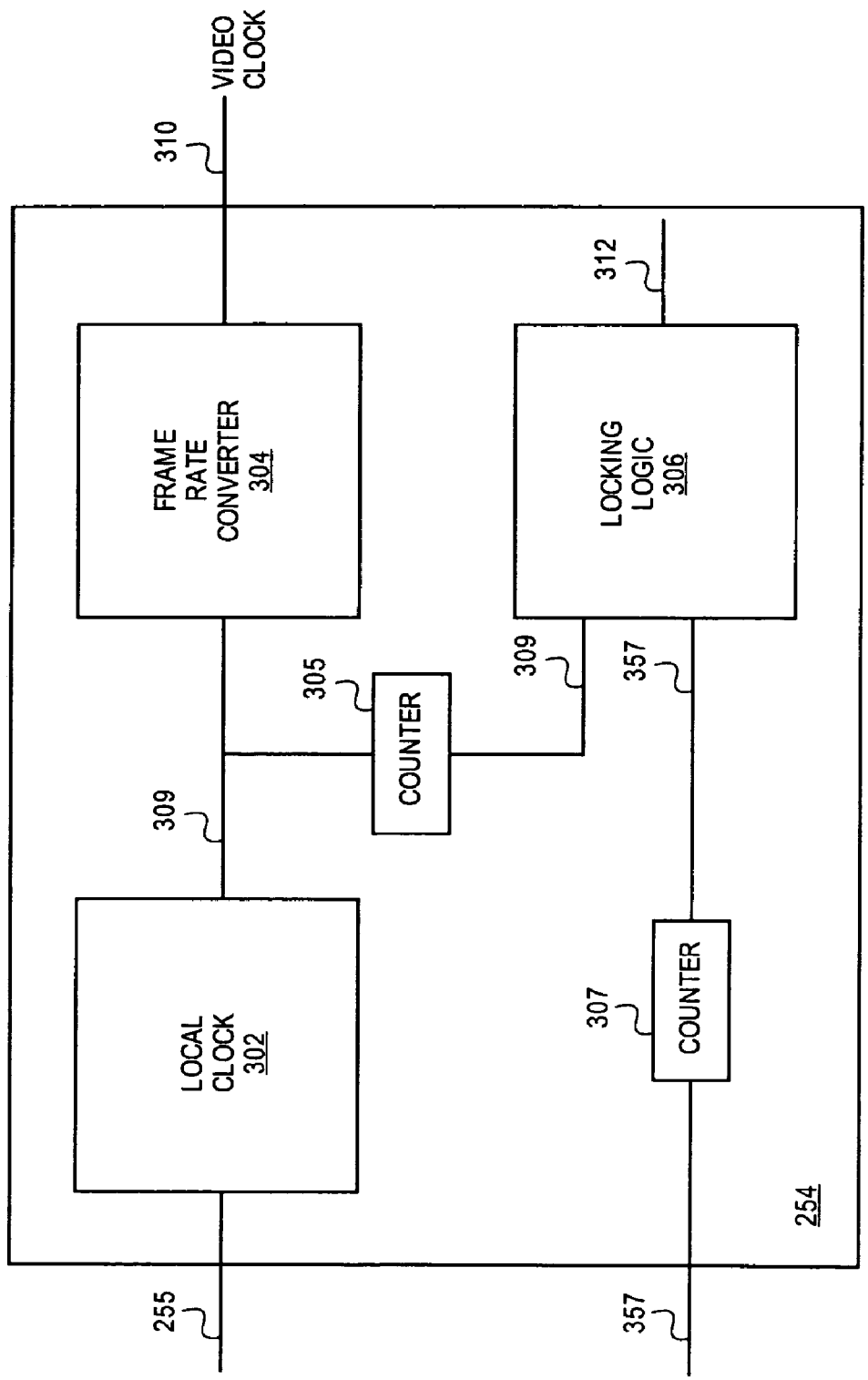
FIG. 3 is a block diagram illustrating a synchronization circuit according to one embodiment of the present invention.

FIG. 3 is a block diagram illustrating one embodiment of synchronizer 254 depicted in FIG. 2. Referring to FIG. 3, synchronizer 254 includes local clock 302, frame rate converter 304, locking logic 306 and counters 305 and 307. Local clock 302 represents an oscillator known in the art to produce a series of clock pulses. Local clock 302 may provide timing signals for all or some of the components of A/V device 108 shown in FIG. 2. Similarly, various clock sources in addition to local clock 302 may also be utilized within A/V device 108.

Although local clock 302 may produce a consistent clock pulse within A/V device 108, typically there is no guarantee other A/V devices within a common system, such as A/V device 110 of FIG. 1, will operate at the same frequency. Even if the devices are designed to operate at the same nominal frequency, slight variations between the respective operating frequencies may nonetheless result. Additionally, the clock sources may drift from one another if the operating frequencies are not locked to common signal. Therefore, to avoid the occurrence of such "clock drift," a consistent house reference signal is typically routed to each of the A/V devices. Accordingly, each of the A/V devices may lock their respective operating frequencies to the substantially fixed frequency of the house reference signal. In one embodiment of the present invention, local clock 302 includes logic to lock the operating frequency of local clock 302 to house reference signal 255.

Frame rate converter 304 represents logic known in the art to produce a desired synchronous output signal based upon a substantially fixed input frequency such as that provided by clock output 309. In one embodiment, frame rate converter 304 generates video clock signal 310 measured in frames per second, based on clock output 309. In addition to handling video data, frame rate converter 304 is similarly equipped to sample audio data. Frame rate converter 304 may sample audio data for example, at a nominal rate of 48,000 samples per second based on clock output 309.

Synchronizer 254 also includes isochronous signal line 357. Isochronous signal line 357 supplies isochronous network packets including timing information to synchronizer 254. In one embodiment, isochronous signal line 357 represents side-band connection 253, whereas in other embodiments, isochronous signal line 357 represents second I/O bus 250. Counters 305 and 307 sample the respective operating frequencies of clock output 309 and isochronous signal line 357 before being fed into locking logic 306.

Locking logic 306 represents logic to lock a first input signal operating at a first frequency to a second input signal operating at a second frequency. In one embodiment, locking logic 306 locks clock output 309 to the operating frequency of isochronous signal line 357 resulting in a locked cycle time 312. Locking logic 306 also includes logic to determine offset and scale factors between the two input signals. In one embodiment, a scale factor represents the magnitude by which the frequencies of the input signals vary, whereas an offset factor represents the amount in time that one frequency leads or lags the other frequency. In one embodiment the locked cycle time 312 is ignored, whereas the offset and scale factors are further utilized to modify video clock signal 310.

Figure 4:
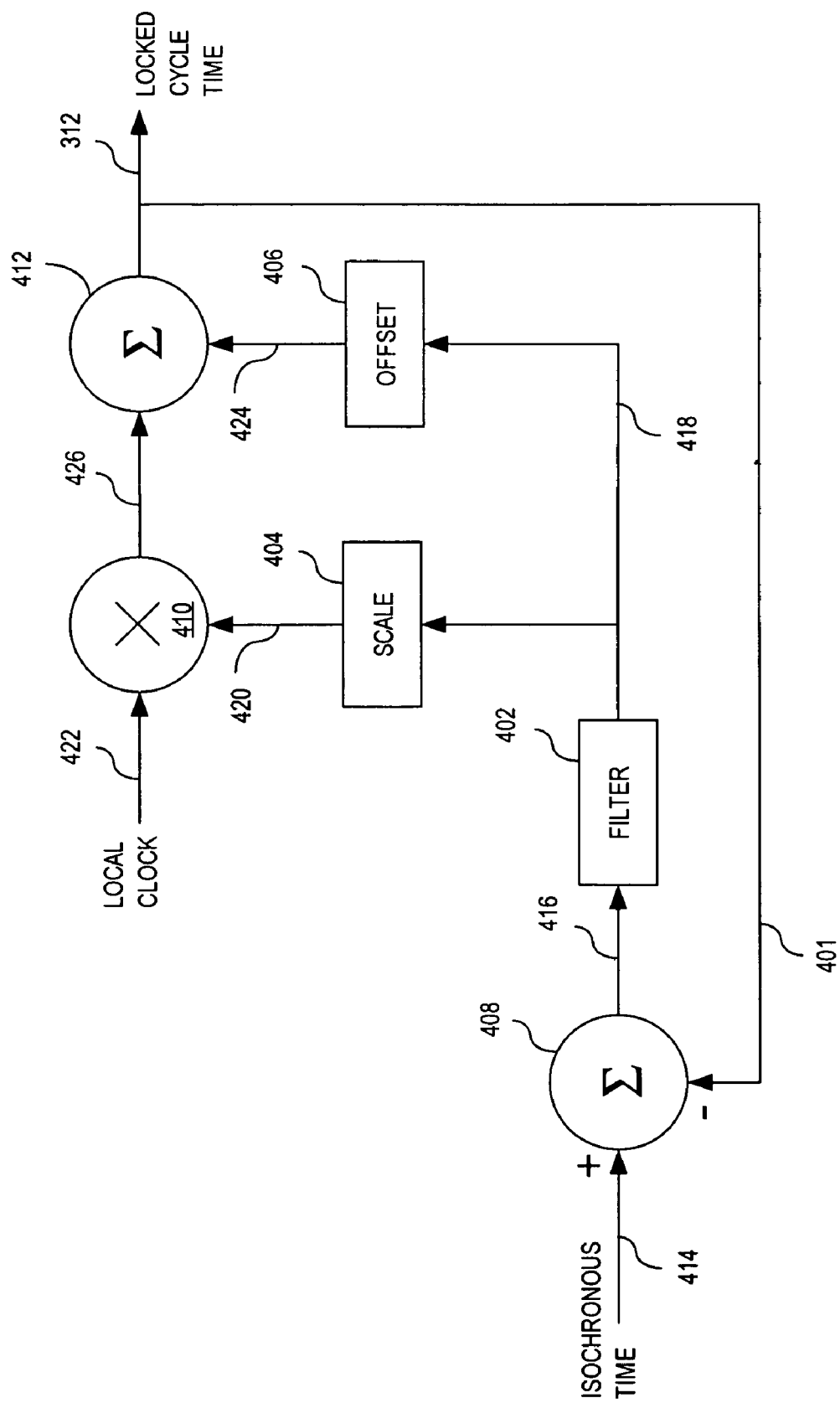
FIG. 4 is a block diagram illustrating frequency locking logic according to one embodiment of the present invention.

FIG. 4 is a block diagram illustrating one embodiment of locking logic 306. Locking logic 306 includes filter block 402, scale block 404, offset block 406, and feedback loop 401. In one embodiment, locking logic 306 utilizes a modified phase lock loop design to determine the offset and scale factors described herein. In one embodiment, locking logic 306 differences (408) an isochronous time signal 414 with a locked cycle time signal supplied by feedback loop 401. In one embodiment, the isochronous time signal 414 is an IEEE 1394 isochronous time signal received on isochronous signal line 357. The difference (416) between the isochronous time signal and the locked cycle time signal is fed through a low pass filter represented by filter block 402. From the filtered signal 418, both scale and offset factors are determined by scale block 404 and offset block 406 respectively. The scale factor 420 is applied (410) to a local clock signal 422 such as, for example, clock output 309. The offset factor 424 is then applied (412) to the scaled local clock signal 426, resulting in locked cycle time 312. In one embodiment, the resulting locked cycle time 312 is not further utilized other than for feedback purposes.

By modifying video clock signal 310 an amount equivalent to the determined scale and offset factors, it is therefore possible to represent video clock signal 310 in terms of isochronous time. Stated another way, data recorded and/or generated based on a reference time domain (i.e. local clock 302 alone or in combination with house reference signal 255) may be represented in terms of the transport time domain (i.e. that of isochronous transport medium 104). For example, using such a conversion scheme, it is possible to predict what the isochronous time should be for a particular video frame that is to be transmitted at some time in the future. Additionally, just as video clock signal 310 may be represented in terms of isochronous time, data received on isochronous signal line 357 may likewise be represented in terms of video clock time.

Thus, a method and apparatus for generating timestamps for isochronous data has been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
 receiving a first signal defining a reference time domain associated with a first frequency;
 receiving a second signal defining a transport time domain asynchronous to the reference time domain and associated with a second frequency that is different from the first frequency;

wherein the second signal is an isochronous clock signal that is distributed across an isochronous network by a master node and wherein the first signal distributes, to multiple audio-video devices, a synchronization signal that is asynchronous to the second signal; and generating an isochronous network packet including a first timestamp indicating a point in time measured with respect to the reference time domain and represented as a measure of the transport time domain.

2. The method of claim 1, wherein receiving the second signal comprises receiving at least one isochronous network packet including a second timestamp indicating an isochronous network cycle-time.

3. The method of claim 2, wherein the isochronous network cycle time is determined by an IEEE 1394 cycle master device.

4. The method of claim 1, wherein generating the isochronous network packet includes associating the timestamp with at least one frame of generated video data to be transmitted across an isochronous network.

5. The method of claim 1, wherein generating the isochronous network packet includes associating the timestamp with at least one frame of received video data to be transmitted across an isochronous network.

6. The method of claim 1, wherein the generating includes locking the first signal to the second frequency.

7. An article of manufacture comprising a machine readable medium having a plurality of machine readable instructions stored thereon, wherein when executed by a processor, the instructions cause the processor to:

receive a first signal defining a reference time domain associated with a first frequency;

receive a second signal defining a transport time domain asynchronous to the reference time domain and associated with a second frequency that is different from the first frequency;

wherein the second signal is an isochronous clock signal that is distributed across an isochronous network by a master node and wherein the first signal distributes, to multiple audio-video devices, a synchronization signal that is asynchronous to the second signal; and generate an isochronous network packet including a first timestamp indicating a point in time measured with respect to the reference time domain and represented as a measure of the transport time domain.

8. The article of manufacture of claim 7, wherein the machine readable instructions that cause the processor to receive the second signal further cause the processor to receive at least one isochronous network packet including a second timestamp indicating an isochronous network cycle-time.

9. The article of manufacture of claim 8, wherein the isochronous network cycle time is determined by an IEEE 1394 cycle master device.

10. The article of manufacture of claim 7, wherein the machine readable instructions that cause the processor to generate the isochronous network packet further cause the processor to associate the timestamp with at least one frame of generated video data to be transmitted across an isochronous network.

11. The article of manufacture of claim 7, wherein the machine readable instructions that cause the processor to generate the isochronous network packet further cause the processor to associate the timestamp with at least one frame of received video data to be transmitted across an isochronous network.

12. An apparatus comprising:

means for receiving a first signal defining a reference time domain associated with a first frequency;

means for receiving a second signal defining a transport time domain asynchronous to the reference time domain and associated with a second frequency that is different from the first frequency;

wherein the second signal is an isochronous clock signal that is distributed across an isochronous network by a master node and wherein the first signal distributes, to multiple audio-video devices, a synchronization signal that is asynchronous to the second signal; and means for generating an isochronous network packet including a timestamp indicating a point in time measured with respect to the reference time domain and represented as a measure of the transport time domain.

13. The apparatus of claim 12, wherein means for receiving the second signal comprises means for receiving at least one isochronous network packet including a timestamp indicating an isochronous network cycle-time.

14. The apparatus of claim 12, wherein the means for generating the isochronous network packet includes means for associating the generated timestamp with at least one frame of generated video data to be transmitted across an isochronous network.

15. The apparatus of claim 12, wherein the means for generating the isochronous network packet includes means for associating the generated timestamp with at least one frame of received video data to be transmitted across an isochronous network.

16. A system comprising:

a communications port to receive a first signal defining a reference time domain associated with a first frequency; and a network interface to receive a second signal defining a transport time domain asynchronous to the reference time domain and associated with a second frequency that is different from the first frequency, wherein the second signal is an isochronous clock signal that is distributed across an isochronous network by a master node and wherein the first signal distributes, to multiple audio-video devices, a synchronization signal that is asynchronous to the second signal, and to generate an isochronous network packet including a timestamp indicating a point in time measured with respect to the reference time domain and represented as a measure of the transport time domain.

17. The system of claim 16, wherein the network interface comprises logic to receive at least one isochronous network packet including a timestamp indicating an isochronous network time.

* * * * *